(12) United States Patent
Downey

(10) Patent No.: US 7,793,972 B2
(45) Date of Patent: Sep. 14, 2010

(54) FRONT PILLAR TRIM PANEL WITH TETHER

(75) Inventor: Brian Downey, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 229 days.

(21) Appl. No.: 11/685,987

(22) Filed: Mar. 14, 2007

(65) Prior Publication Data

US 2008/0224453 A1 Sep. 18, 2008

(51) Int. Cl.
*B60R 21/21* (2006.01)
(52) U.S. Cl. ............... 280/728.3; 280/730.2; 280/743.2
(58) Field of Classification Search .............. 280/728.3, 280/730.2, 732, 743.2, 743.1; 296/193.06, 296/39.1, 1.08
See application file for complete search history.

(56) References Cited

U.S. PATENT DOCUMENTS

| | | | |
|---|---|---|---|
| 4,546,850 A | | 10/1985 | Litner |
| 4,911,471 A | * | 3/1990 | Hirabayashi ................ 280/732 |
| 5,265,903 A | * | 11/1993 | Kuretake et al. .......... 280/730.2 |
| 5,385,366 A | * | 1/1995 | Frank et al. ............... 280/728.3 |
| 5,398,959 A | * | 3/1995 | Avila ........................ 280/728.3 |
| 5,447,327 A | * | 9/1995 | Jarboe et al. ............... 280/728.3 |
| 5,460,401 A | * | 10/1995 | Gans et al. ................ 280/728.3 |
| 5,474,324 A | * | 12/1995 | Bentley et al. ............. 280/728.3 |
| 5,478,107 A | * | 12/1995 | Yamagishi et al. ........ 280/728.3 |
| 5,496,060 A | * | 3/1996 | Whited et al. ............. 280/728.3 |
| 5,533,746 A | * | 7/1996 | Whited ...................... 280/728.2 |
| 5,613,701 A | * | 3/1997 | Bentley et al. ............. 280/728.3 |
| 5,647,607 A | * | 7/1997 | Bolieau ..................... 280/728.2 |
| 5,651,562 A | * | 7/1997 | Hagen et al. ............... 280/728.3 |
| 5,731,551 A | | 3/1998 | Petrucci |
| 5,941,557 A | | 8/1999 | Mullins, Jr. et al. |
| 6,325,415 B1 | * | 12/2001 | Zelinski et al. ........... 280/743.2 |
| 6,435,554 B1 | * | 8/2002 | Feldman ................... 280/743.2 |
| 6,502,855 B1 | * | 1/2003 | Greiner et al. ............ 280/730.2 |
| 6,619,595 B2 | | 9/2003 | Hinokio |
| 6,758,490 B2 | | 7/2004 | Hoeft et al. |
| 6,802,528 B2 | * | 10/2004 | Short et al. ............... 280/728.3 |
| 6,863,300 B2 | | 3/2005 | Ryu |
| 7,014,208 B2 | | 3/2006 | DePue et al. |
| 7,044,500 B2 | | 5/2006 | Kalandek et al. |
| 7,658,404 B2 | * | 2/2010 | Sadano et al. ................ 280/732 |
| 2002/0158450 A1 | | 10/2002 | Hoeft et al. |
| 2005/0140125 A1 | | 6/2005 | Noguchi |
| 2006/0043701 A1 | * | 3/2006 | Zagrodnicki et al. ...... 280/728.3 |
| 2006/0082106 A1 | | 4/2006 | Hier et al. |
| 2007/0222192 A1 | * | 9/2007 | Yamagiwa et al. ........ 280/730.2 |
| 2008/0106082 A1 | * | 5/2008 | Choi ......................... 280/743.1 |

FOREIGN PATENT DOCUMENTS

| | | | |
|---|---|---|---|
| EP | 0422322 | | 2/1990 |
| JP | 05050893 A | * | 3/1993 |

* cited by examiner

*Primary Examiner*—Paul N Dickson
*Assistant Examiner*—Laura Freedman
(74) *Attorney, Agent, or Firm*—Young Basile

(57) ABSTRACT

A vehicular interior trim piece with a tether for use with a side curtain airbag. The tether is attached to an integral first panel portion and a second panel portion which rotates about a hinge out of the path of the airbag. The tether prevents complete detachment of the second panel from the first panel.

22 Claims, 7 Drawing Sheets

SECTION A-A

SECTION A-A

FRONT PILLAR TRIM PANEL WITH TETHER

FIELD OF THE INVENTION

The present invention relates to a vehicular interior trim panel, for example, a front A-pillar trim panel used to cover a side curtain airbag having a tether to prevent complete detachment of the trim panel into the passenger compartment.

BACKGROUND OF THE INVENTION

Inflatable restraint devices, commonly called airbags, are standard equipment on most new vehicles. As consumer's concerns for safety have increased, additional airbags have been employed in different areas of the vehicle other than in the steering wheel and the passenger side of the instrument panel. Side curtain airbags have grown in popularity due to the lack of a crush zone and energy dissipation capacity in the sides of vehicles. Side curtain airbags have been employed or stored in areas of the roof rails and headliners or in the side doors. These airbag devices are typically concealed from occupant view by interior trim panels.

Interior trim panels concealing the air bag devices are a challenge for designers and engineers due to the competing interests of permitting the airbags to be easily deployed in the desired areas while maintaining aesthetic appeal of the vehicle passenger compartment. The trim panels must also be capable of enduring the explosive forces of air bag devices without being dislodged from the vehicular structure that they are attached to and potentially entering the passenger compartment. These challenges are accentuated in the front A-pillar area of vehicles due to the limited space and position proximate to the driver and front passenger.

Known trim panel and instrument panel designs for concealing air bag devices have included rupturable covers, for example, in steering wheel and passenger side frontal airbags deployable from the instrument panel as well as other interior trim panels. These devices have included so-called tethers or other devices which attempt to prevent the trim panel, or portions thereof, from detaching from their attachment points to the vehicle or a portion of the trim panel from breaking off and detaching under the explosive forces imparted by the airbag.

The known devices suffer from several disadvantages including the tethers being applied to the outer surface of the trim panel, i.e. the side toward the interior of the passenger compartment visible by the occupants, and use of separate straps providing a second or auxiliary attachment of the trim panel to the vehicle through use of mechanical fasteners. Tethers attached to the outer surface of the trim panel create difficulties in applying an exterior coating or covering over the trim panel to make it more aesthetically appealing and use of additional mechanical fasteners adds costs and additional assembly time in the manufacture of the vehicle.

SUMMARY OF INVENTION

It would be desirable to provide an interior trim panel with a tether to prevent detachment of a portion of the trim panel and potential entry into the passenger compartment that is easily integrated into the manufacturing process of the trim panel and does not interfere with the aesthetics of the panel or require secondary attachment of the tether to the vehicular structure. It is further desirable to have an interior trim panel with these advantages that is useable in the front A-pillar region of the passenger compartment for use with side curtain airbags that deploy from the side roof rail region by the driver and passenger side windows adjacent the windshield.

In one embodiment of the invention, a trim panel is attached in selected areas to the body structure of the vehicle. The trim panel includes an integral first portion and a second portion that include an outside surface toward the passenger compartment and an inside surface toward the body structure not visible by the occupants. The first and second panel portions are joined in a frangible area creating a notch or hinge on the inside surface of the trim panel out of view of the occupants. This notch or hinge area permits the second portion to rotate away from the airbag on expansion of the airbag to provide a passageway for the airbag to expand out from behind the trim panel toward its desired location.

The trim panel includes a tether for attachment to the first and second portions of the trim panel. In one embodiment, the tether is integrally molded into the trim panel during the manufacture of the trim panel so as to not affect the aesthetic appearance of the trim panel to the occupants. In one embodiment, the tether is positioned toward the middle of the panel away from both the outer surface and the inner surface of the trim panel.

In another embodiment, the tether is integrally molded into the trim panel as described above, but is substantially located at the inner surface of the trim panel adjacent the vehicle structure the trim panel is attached to.

In another embodiment, the tether is not integrally molded into the trim panel material, but securely attached to the inner surfaces of the trim panel portions through conventional processes.

Regardless of the method of attachment of the tether to the trim panel, either integrally molded or conventionally attached, the tether interconnects the first portion and the second portion across the frangible portion of the trim panel. The connection of the first and second portions by the tether, or tethers, prevents the second portion from being completely detached from the first portion in the event the second portion fractures or breaks away from the first portion.

Other applications of the present invention will become apparent to those skilled in the field when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views and wherein.

DETAILED DESCRIPTION

Figure 1:
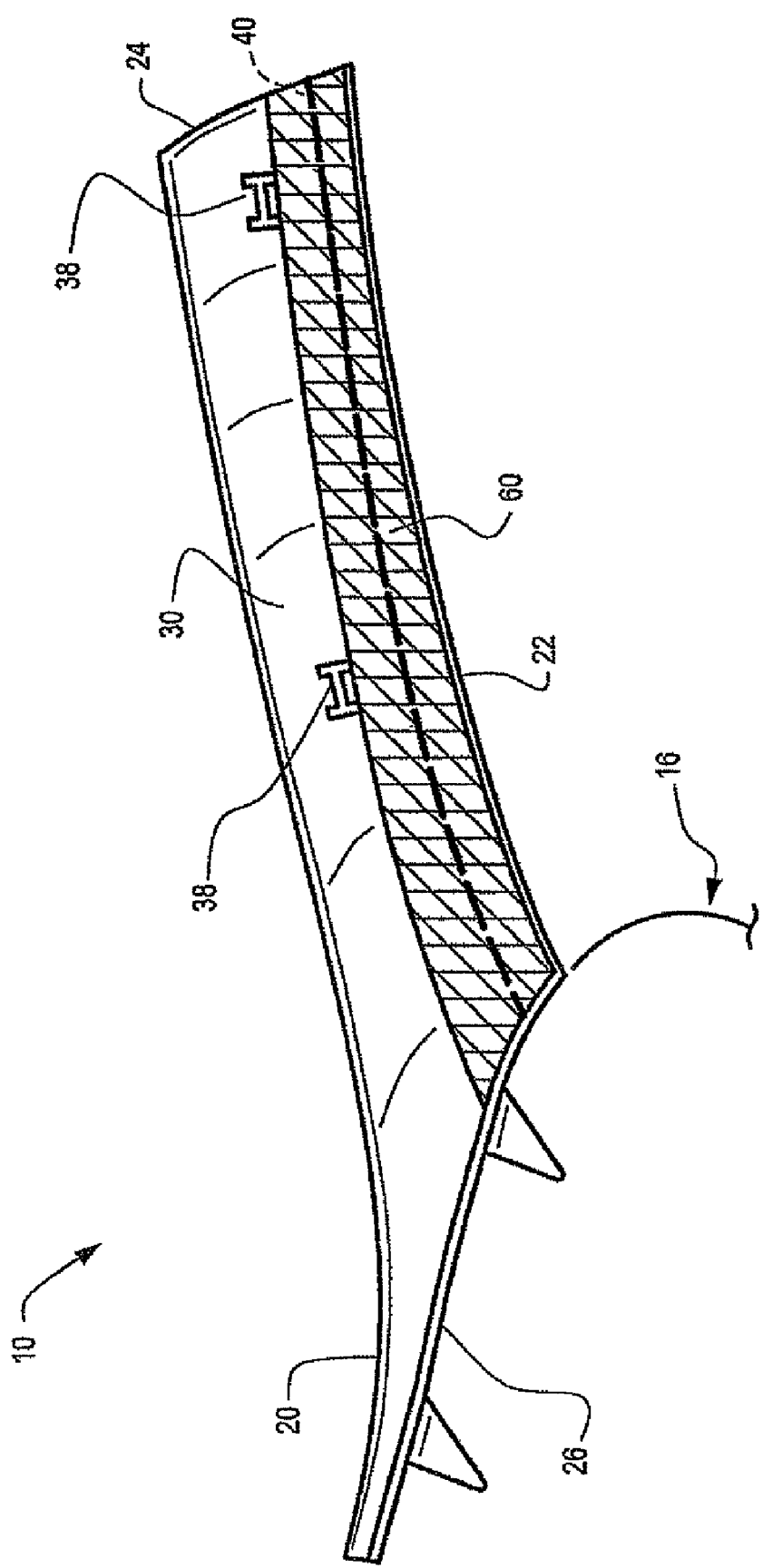
FIG. 1 is a simplified schematic view of the inner surface or back side of a vehicular trim piece used to cover the front A-pillar portion of the vehicle. The tether is shown on the interior surface.
Figure 2:
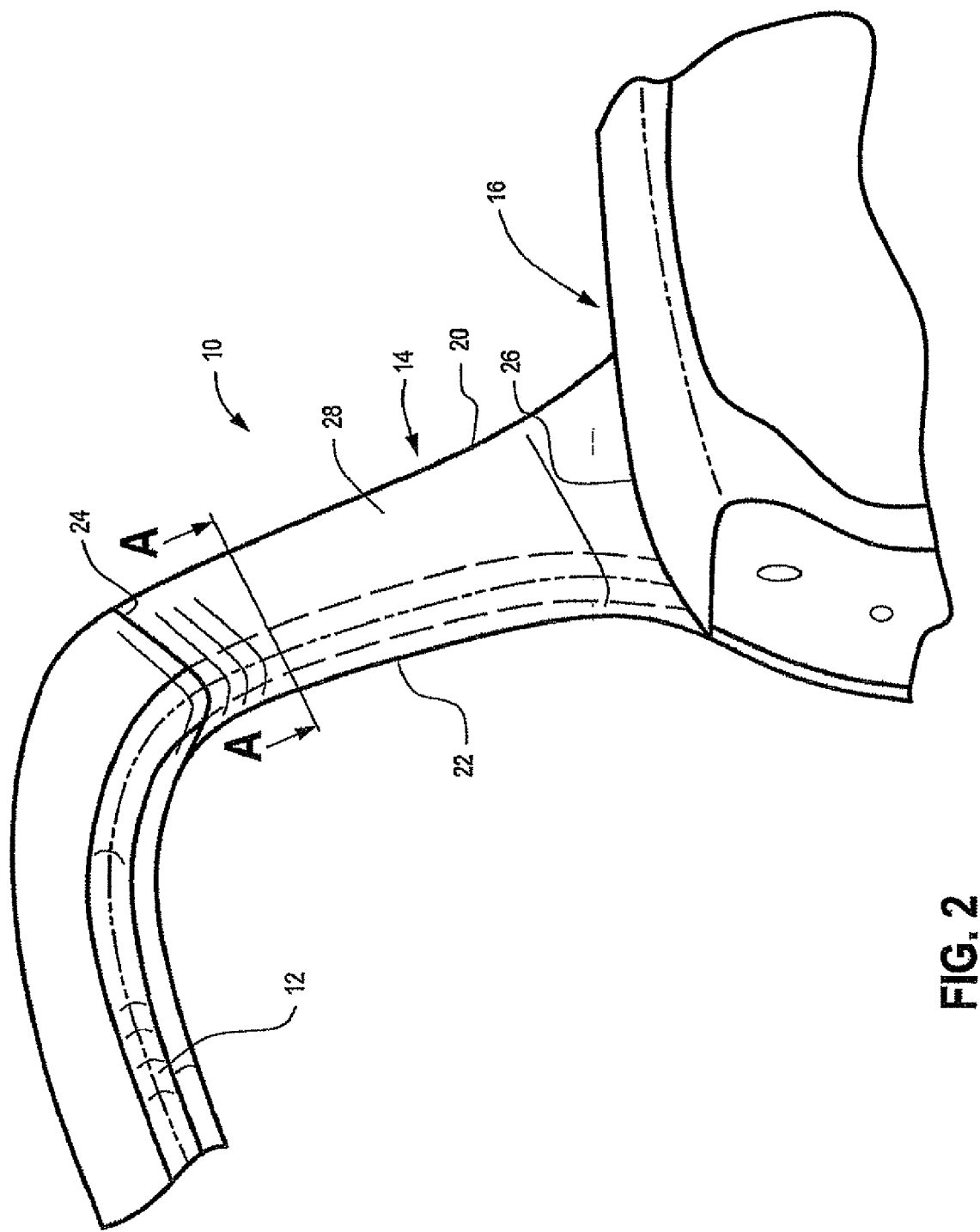
FIG. 2 is a simplified schematic view of the front A-pillar trim piece installed on the driver's side A-pillar adjacent the roof rail, instrument panel and windshield. The Figure shows a simplified representation of a side curtain airbag in the stored or non-deployed state with the interior roof rail trim piece removed for clarity.

Referring to FIGS. 1-10, several embodiments of a trim panel having a tether are illustrated for use as a vehicular interior trim panel in the front A-pillar region of the passenger compartment used to cover a side curtain airbag. Referring to FIGS. 1 and 2, an interior trim panel with tether 10 is illustrated. Trim panel 10 is positioned, for example, in the front A-pillar portion 14 of the vehicle passenger compartment and covers a side curtain air bag 12 mounted in the roof rail and A-pillar regions behind the trim panel 10. In this position, the trim panel 10 is positioned adjacent the instrument panel 16, windshield 18 and driver side door (not shown).

Figure 5:
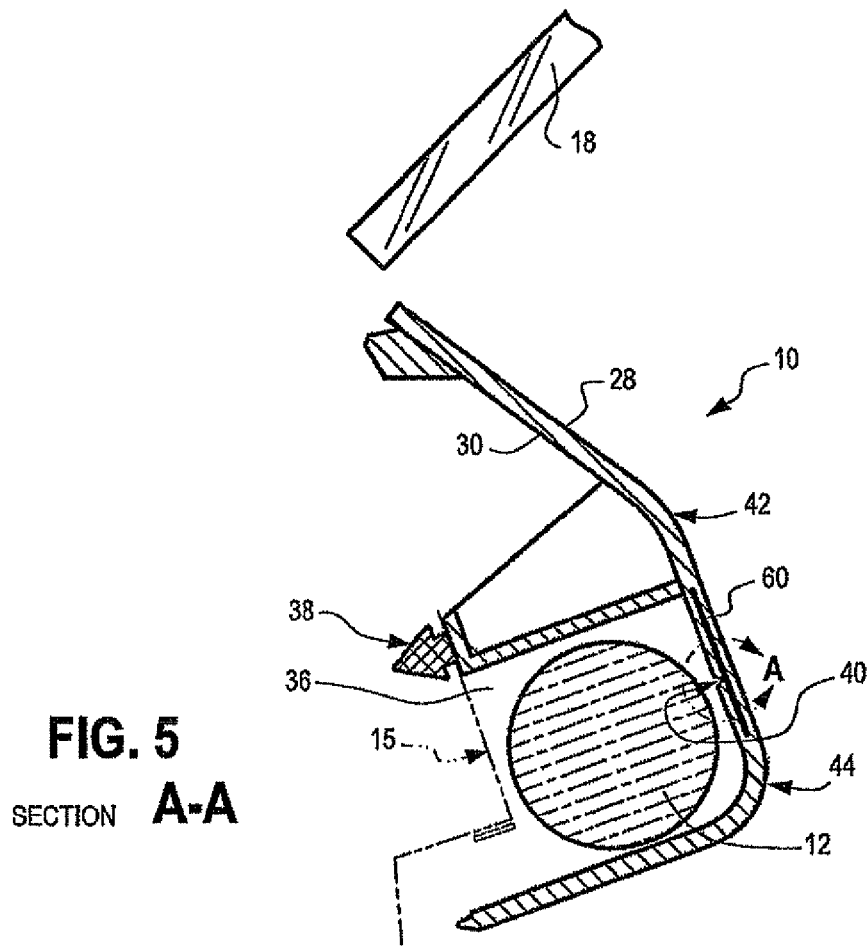
FIG. 5 is a sectional view taken along line A-A in FIG. 2: The Figure shows a simplified schematic view of a side curtain airbag in the stored and undeployed state covered by the A-pillar trim piece.
Figure 7:
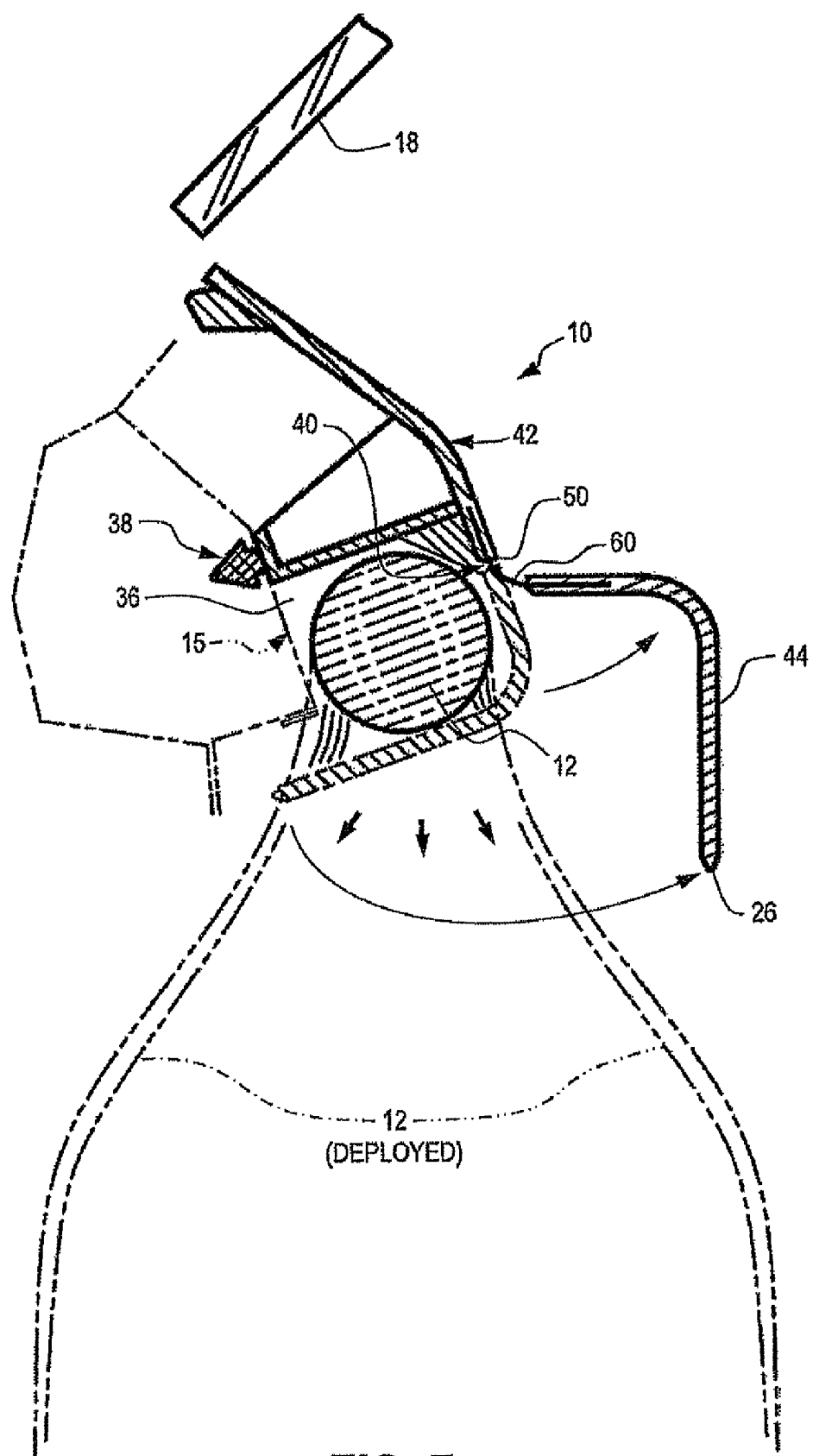
FIG. 7 is a sectional view taken along line A-A in FIG. 2 similar to FIG. 5, but illustrating the rotational movement of the second portion of the trim panel as the side curtain airbag is deployed. The Figure shows the tether connecting both the first portion and the second portion preventing complete detachment of the second portion and preventing the second panel portion from projecting into the passenger compartment.
Figure 9:
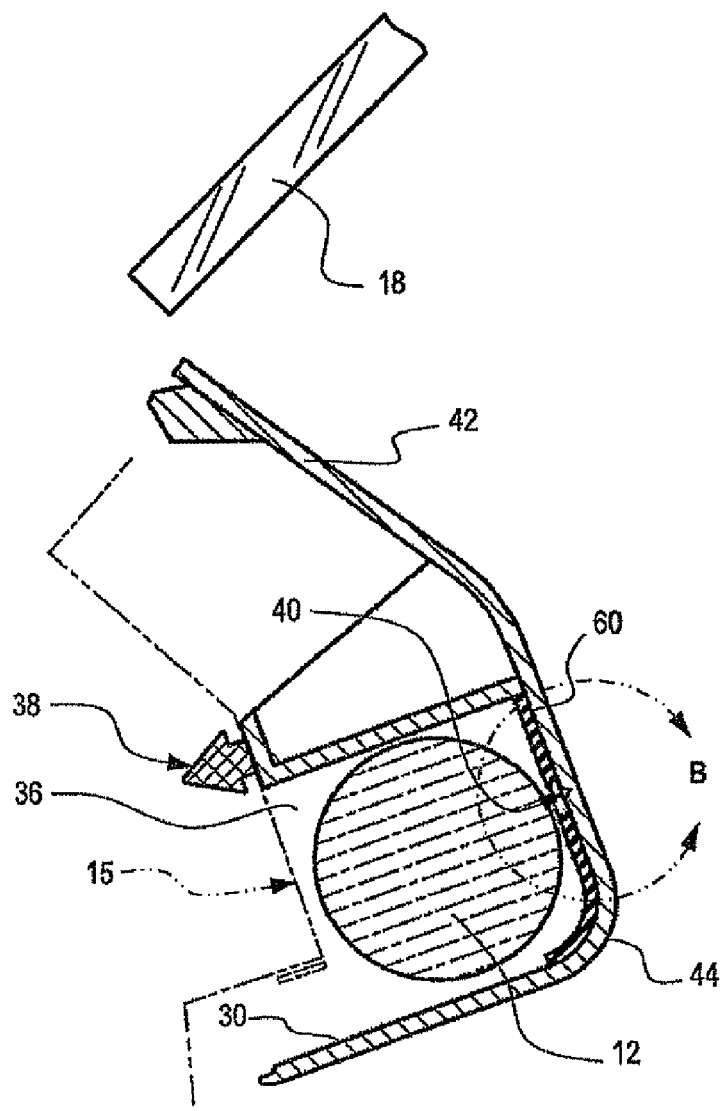
FIG. 9 is sectional view taken along line A-A of FIG. 2 illustrating an alternate embodiment of the invention illustrating the tether material as attached to the inner surface of the trim panel.

Trim panel 10 includes a forward portion 20 (toward the front of the vehicle), a rearward portion 22 (toward the rear of the vehicle), an upper portion 24 (toward the headliner and roof of the vehicle) and a lower portion 26 (toward the instrument panel 16). Trim panel 10 further includes an outer surface 28 (toward the interior of the passenger compartment generally visible by the occupants) and an inner surface 30 (toward the exterior of the vehicle generally not visible by the occupants in normal conditions). The inner surface 30 is adjacent the A-pillar vehicle body structure 15, typically welded sheet metal, positioned behind the trim panel as best seen in FIGS. 5, 7 and 9. Inner surface 30 and A-pillar structure 15 define a chamber 36 sufficient to house or store airbag 12.

Trim panel 10 may be made from polypropylene, polyethylene or other polymers or elastomers, or combinations thereof, known by those skilled in the art. Trim panel 10 may be manufactured by injection molding or other molding processes known by those skilled in the art. It is contemplated that trim panel 10 may be useful in other trim panel applications other than in the front A-pillar regions as illustrated and described and can take other forms without deviating from the invention.

Figure 6:
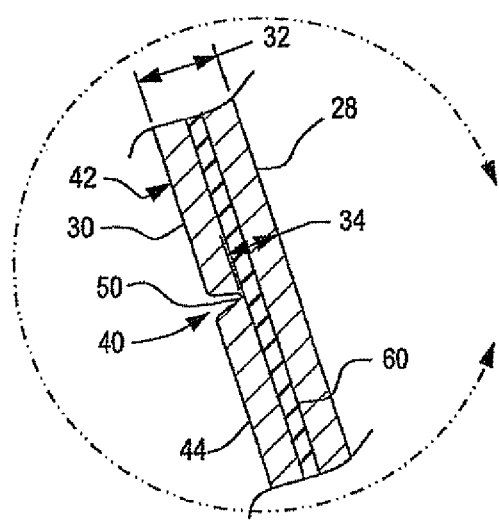
FIG. 6 is an enlarged view in the area marked A in FIG. 5. In this embodiment, the tether is shown integrally molded in a position away from both the outer surface and the inner surface of the trim panel.

The trim panel 10 outer surface 28 and inner surface 30 define a general first thickness 32 between the outer surface 28 and the inner surface 30 as best seen in FIG. 6. It is understood that due to the nature of the trim panel part and manufacturing processes used, this general first thickness may vary slightly in different areas of the trim panel 10.

Figure 3:
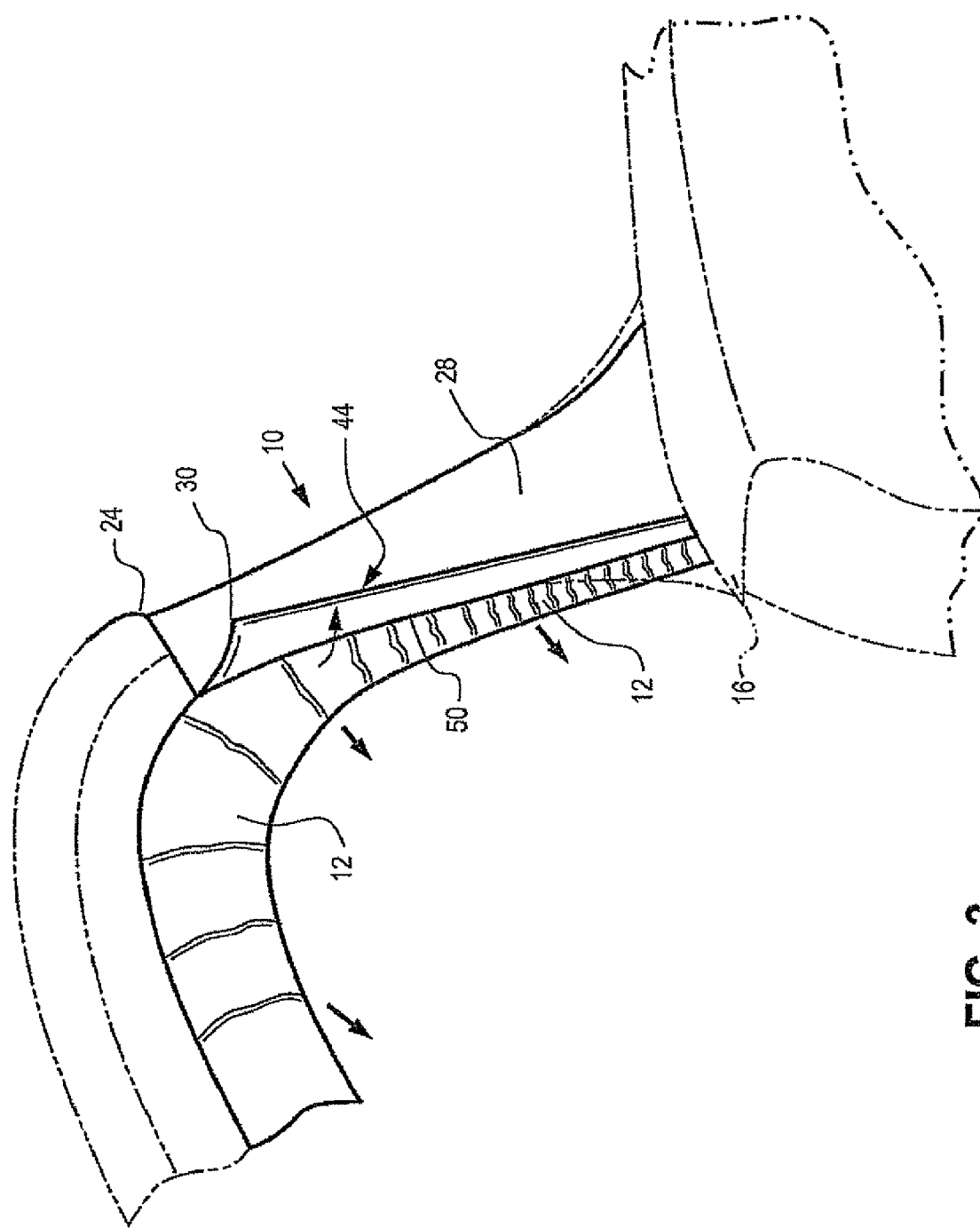
FIG. 3 is a simplified schematic of the A-pillar trim piece installed in a similar fashion as in FIG. 2. The Figure shows partial deployment of a side curtain airbag as the airbag is expanding along the roof rail and A-pillar areas. The A-pillar trim piece is shown as partially rotated away from the airbag based on applied force from the deploying airbag.
Figure 4:
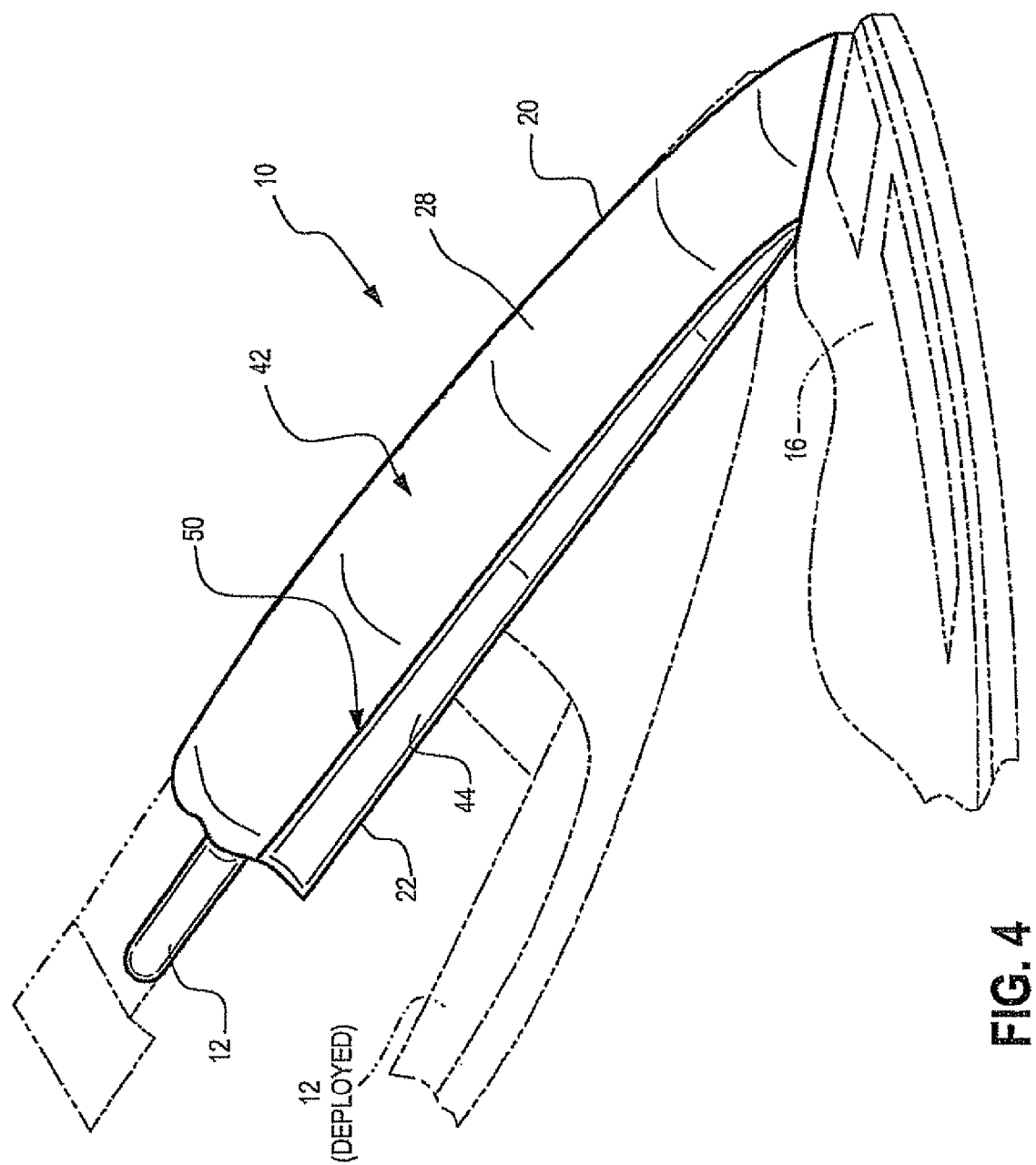
FIG. 4 is a simplified schematic of the A-pillar trim piece installed as illustrated in FIG. 2. Similar to FIG. 3, a portion of the A-pillar trim piece is shown rotated away from the side curtain airbag which is schematically shown in the fully deployed position.
Figure 10:
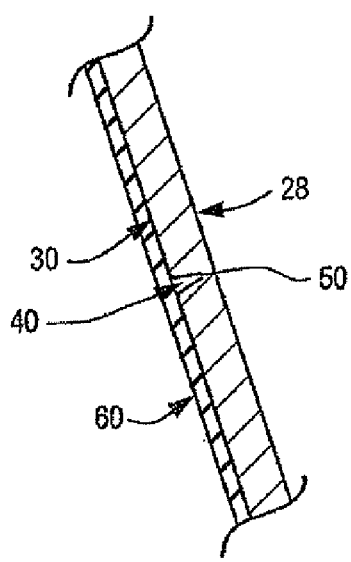
FIG. 10 is an enlarged view in the area B shown in FIG. 9.

Referring to FIGS. 3, 4 and 5, trim panel 10 includes an integral first panel or first portion 42 and a second panel or second portion 44. First portion 42 is integrally joined to second panel 44 along a frangible portion or area 40 which forms an elongate and natural hinge 50 as best seen in FIGS 3, 4 and 6. In a preferred embodiment, frangible portion 40 is, for example, created by a notch or hinge 50. As best seen in FIGS. 6 and 10, frangible portion 40 generally has a second thickness 34 less than the immediately surrounding first thickness 32 as best seen in FIG. 6. In one embodiment, the hinge 50 is positioned on the inner surface 30 of trim panel 10 so as not be visible by the vehicle occupants, In one embodiment, hinge 50 is positioned along substantially the entire length of trim panel 10 between the upper 24 and lower 26 regions as vest seen in FIGS. 1, 3 and 4. Frangible portion 40 is positioned on the inner surface 30 creating hinge 50 along the outer surface 28 along an equal length of trim panel 10. It is understood that the location and orientation of frangible portion 40 and hinge 50 may vary depending on the application of trim panel 10 and the type, position and intended expansion of side curtain airbag 12. It is further understood that hinge 50 may be formed by structural configurations other than a localized reduction of thickness in the form of a notch, for example, structural configurations that would concentrate the stresses in the desired area to produce a hinge effect know by those skilled in the art.

In one embodiment, trim panel 10 is attached to the front vehicle A-pillar structure 15 through the first portion 42 by fasteners 38 generally shown in FIGS. 1, 5, 7 and 9. The fasteners are typically polymer clips but may be other types of fasteners known by those skilled in the art.

Referring to FIGS. 1 and 5-10, Trim panel 10 further includes a tether 60. In one embodiment, tether 60 is integrally molded into trim panel 10 and is positioned in the first thickness 32 at a desired location depending on various factors including the trim panel 10 material used, the first 32 and second 34 thicknesses, the geometry of trim panel 10, the tether 60 material, the type and deployment of the airbag 12 and other factors known by those skilled in the art. In a preferred embodiment for trim panels to be manufactured, the tether 60 is integrally molded into and positioned between the outer surface 28 and the inner surface 30 as best seen in FIGS. 5-7. In this embodiment, tether 60 is positioned approximately in the middle of the first thickness 32 adjacent to and spanning across the frangible portion 40 as best seen in FIG. 6. In this embodiment, tether 60 extends substantially the entire length of trim panel 10 along frangible portion 40 as generally shown in FIG. 1. It is understood that tether 60 may cover a greater or lesser area than the entire length of trim panel 20 or the illustrated width across trim panel 10 as generally shown in FIG. 1. It is further understood that tether 60 may be one continuous piece or several separate pieces. It is understood that tether 60 will at least interconnect or cover a part of the first portion 42 and second portion 44 to prevent complete detachment of second portion 44 from first portion 42 as described more fully below.

Figure 8:
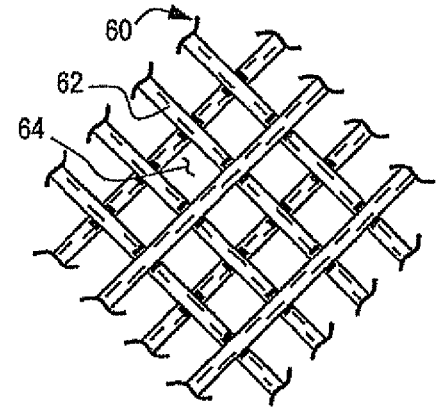
FIG. 8 is an enlarged view of one embodiment of the tether material illustrating a cross-woven fabric material.

As best seen in FIG. 8, tether 60 is preferably made from a sheet of flexible fabric material having a selected surface area 64. The selected surface area and size of tether 60 is sufficient to cover or span at least a portion of frangible portion 40. In this embodiment, tether 60 is preferably made from a woven, fibrous material 62 such as nylon. The tether 60 material has the capability to be incorporated into the typical molding process or attachment to trim panel 10 as described later. The tether 60 material must be relatively flexible and capable of withstanding the forces exerted by the expansion of airbag 12 without substantial fracture or tearing. It is understood that other materials, of different properties, sizes and orientations may be used having these general characteristics known by those skilled in the art without deviating from the invention.

In another embodiment, not shown, tether 60 is integrally molded into trim panel 10 as generally described above. In this embodiment, tether 60 is positioned toward and is substantially in contact with the inner surface 30.

Referring to FIGS. 1, 9 and 10, another embodiment of trim panel 10 is illustrated. In this embodiment, tether 60 is not integrally molded into first thickness 32, but is attached to the inner surface 30 spanning at least a part of the frangible portion 40 as best seen in FIG. 10. In this embodiment, tether 60 may similarly extend along substantially the entire length of trim panel 10 as generally shown in FIG. 1 and previously described. Tether 60 may be attached to inner surface 30 through adhesive, ultrasonic bonding, staking and other attachment methods known by those skilled in the art.

Referring to FIG. 2, in operation, trim panel 10 normally covers or conceals the vehicular front A-pillar 14 body structure 15 and the side curtain airbag 12 while providing an aesthetically pleasing appearance for the occupants. In the preferred embodiment, the airbag 12, frangible portion 40, hinge 50, and tether 60 are not visually perceptible from the outer surface by the occupants.

On ignition of the airbag safety device system, the airbag begins to rapidly expand. In the side curtain airbag 12 of the preferred embodiment, airbag 12 expands in a generally downward direction with significant force. As best seen if FIGS. 3, 4 and 7, on contact of airbag 12 with the lower portion of trim panel 10 inner surface 30, the second portion 44 is pushed in a downward or downward and rearward direction. Stress on the trim panel 10 is concentrated at the frangible portion 40. As best seen in FIGS. 3, 4 and 7, second portion 44 is forced to rotate with respect to first portion 42 about hinge 50 in a direction away from airbag 12 along the length of trim panel 10. The permitted and controlled rotation of second portion 44 allows a passageway for airbag 12 to expand to the desired position. The permitted and controlled rotation of second portion 44 further permits first portion 42 to remain securely attached to the A-pillar body structure 15 through fasteners 38.

On rotation of second portion 44 as described, tether 60 flexes or bends along hinge 50 as second portion 44 rotates away from airbag 12. As best seen in FIG. 7, in the event that there is a fracture of trim panel 10 along frangible portion 40, or in any area covered by tether 60, tether 60 remains attached to the first portion 42 and the second portion 44 thereby preventing the second portion 44 from complete detachment from first portion 42 and the possibility of entering the passenger compartment.

While the invention has been described in connection with what is presently considered to be the most practical and preferred embodiments, it is to be understood that the invention is not limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A trim panel selectively attached to vehicular structure for use in a passenger compartment for covering an expandable air bag, the trim panel comprising:

a first portion and a second portion integrally formed as a unitary panel each portion having an inner surface and an outer surface, the inner surfaces of the first and second portions defining a concave recess adapted to receive at least a portion of the expandable airbag, the first and the second portions adapted to radially extend around at least partially surrounding the expandable airbag, the first portion and the unitary second portion defining a frangible portion positioned between the first and the second portions along a first edge of the second portion leaving a freestanding second edge of the second portion opposite the frangible portion not directly in contact with the first portion;

at least one tether having a surface area, the tether connected to the first portion and the second portion adjacent the second portion first edge, wherein substantially all of the tether surface area facing the first and the second portions is in contact with the respective first and second portions, the tether operable to prevent detachment of the second portion from the first portion into the passenger compartment on expansion of the airbag.

2. The trim panel of claim 1 wherein the unitary panel further comprises the tether integrally formed therewith.

3. The trim panel of claim 2 wherein the frangible portion includes an elongate notch defined by the inner surfaces of the unitary panel first and the second portions.

4. The trim panel of claim 3 wherein the tether spans across at least a part of the notch.

5. The trim panel of claim 3 wherein the notch forms a hinge in the unitary panel for pivotal rotation of the second portion with respect to the first portion away from the airbag providing a passageway for expansion of the airbag.

6. The trim panel of claim 2 wherein the tether comprises a sheet of fabric material.

7. The trim panel of claim 2 wherein the integrally formed tether is positioned in substantial contact with the inner surfaces of the first and the second portions.

8. The trim panel of claim 1 wherein the frangible portion includes an elongate notch defined by the inner surfaces of the unitary panel first and second portions.

9. The trim panel of claim 8 wherein the tether is selectively attached to the inner surfaces of the first portion and the second portion spanning across at least a part of the elongate notch.

10. The trim panel of claim 8 wherein the notch forms a hinge in the unitary panel for pivotal rotation of the second portion with respect to the first portion away from the airbag providing a passageway for expansion of the airbag.

11. The trim panel of claim 1 wherein the trim panel is a trim panel covering vehicular A-pillar structure positioned between a windshield and a side door window.

12. The trim panel of claim 1 wherein the at least one tether comprises a plurality of tethers.

13. The trim panel of claim 1 wherein the tether is positioned in substantial contact with the inner surfaces of the first and the second portions.

14. The trim panel of claim 1 further comprising a trim panel width defined by the first portion, the frangible portion and the second portion, wherein the tether spanning less than the full width of the trim panel.

15. A trim panel for selected attachment to a vehicle body pillar structure for use in a passenger compartment for covering an expandable airbag, the trim panel comprising:

a first portion and a second portion integrally formed as a unitary panel each portion having an outer surface and an inner surface, the unitary first portion and the second portion defining a frangible portion positioned between the first and the second portions along a first edge of the second portion leaving a freestanding second portion second edge opposite the frangible portion not directly in contact with the first portion prior to expansion of the airbag, the frangible portion serving as a hinge whereby the freestanding second portion second edge is permitted to pivotally rotate about the hinge away from the airbag on expansion of the airbag, and at least one tether selectively positioned on the inner surface of the first and the second portions adjacent to the vehicle body pillar structure, the at least one tether is selectively attached to the inner surface of the first portion and the inner surface of the second portion adjacent the first edge of the second portion spanning at least a part of the frangible portion to prevent detachment of the second portion from the first portion into the passenger compartment on expansion of the airbag.

16. The trim panel of claim 15 wherein the tether comprises a woven material having a selected surface area.

17. The trim panel of claim 15 wherein the frangible portion, the tether and the second portion first edge lie substantially in a first plane, the free standing second portion second edge is positioned in a second plane angularly offset from the first plane prior to expansion of the airbag, wherein at least a portion of the first portion and the second portion at least partially radially surround the expandable airbag.

18. The trim panel of claim 15 further comprising a trim panel width defined by the first portion, the frangible portion and the second portion, wherein the tether spanning less than the full width of the trim panel.

19. A trim panel selectively attached to vehicular structure for use in a passenger compartment for covering an expandable air bag, the trim panel comprising:

a first portion and a second portion integrally formed as a unitary panel each portion having an inner surface and an outer surface, the first portion and the unitary second portion defining a frangible portion positioned between the first and the second portions;

at least one tether integrally formed with the unitary panel, the tether is connected to the first portion and at least a part of the second portion and is positioned within the unitary panel to substantially avoid contact with both the outer surfaces and the inner surfaces to prevent detachment of the second portion from the first portion into the passenger compartment on expansion of the airbag.

20. The trim panel of claim 19 wherein the tether is a woven material having a selected surface area.

21. A trim panel selectively attached to vehicular structure for use in a passenger compartment for covering an expandable air bag, the trim panel comprising:

a first portion and a second portion integrally formed as a unitary panel each portion having an inner surface and an outer surface, the first portion and the unitary second portion defining a frangible portion positioned between the first and the second portions along a first edge of the second portion leaving a freestanding second edge of the second portion opposite the frangible portion not directly in contact with the first portion; and at least one tether connected to the first portion and at least a part of the second portion adjacent the second portion first edge to prevent detachment of the second portion from the first portion into the passenger compartment on expansion of the airbag, wherein the trim panel is a trim panel covering vehicular A-pillar structure positioned between a windshield and a side door window.

22. The trim panel of claim 21 where the first portion includes a flange angularly positioned from a plane of the trim panel having the frangible portion, the flange having an attachment point for securing the trim panel directly to the A-pillar structure.

* * * * *